United States Patent

Mangas et al.

[11] Patent Number: 5,716,276
[45] Date of Patent: Feb. 10, 1998

[54] YOKE SHAFT FOR A VEHICULAR DRIVESHAFT ASSEMBLY

[75] Inventors: Matt J. Mangas, Ft. Wayne, Ind.; Eric M. Fischer, Holland, Ohio

[73] Assignee: Dana Corporation, Toledo, Ohio

[21] Appl. No.: 706,848

[22] Filed: Sep. 3, 1996

[51] Int. Cl.⁶ .................. F16C 1/24; F16D 3/06
[52] U.S. Cl. .................. 464/16; 464/134; 464/162; 464/173
[58] Field of Search .................. 464/7, 16, 134, 464/136, 157, 162, 173, 175, 179, 183

[56] References Cited

U.S. PATENT DOCUMENTS

| | | | |
|---|---|---|---|
| Re. 33,322 | 9/1990 | Sills et al. | 464/162 |
| 2,983,125 | 5/1961 | Peickii et al. | 464/173 |
| 3,234,758 | 2/1966 | Lewis | 464/162 X |
| 3,367,142 | 2/1968 | Groves et al. | 464/162 |
| 3,633,383 | 1/1972 | Kleinschmidt | 464/16 |
| 4,192,153 | 3/1980 | Fisher . | |
| 4,308,729 | 1/1982 | Condon | 464/16 |
| 4,358,284 | 11/1982 | Federmann et al. . | |
| 4,421,497 | 12/1983 | Federmann et al. . | |
| 4,527,978 | 7/1985 | Zackrisson . | |
| 4,552,544 | 11/1985 | Beckman et al. | 464/162 |
| 4,583,960 | 4/1986 | Joyner | 464/134 |
| 5,230,658 | 7/1993 | Burton | 464/162 X |
| 5,299,982 | 4/1994 | Burton | 464/162 X |
| 5,469,931 | 11/1995 | Kawata et al. . | |
| 5,611,135 | 3/1997 | Breese | 464/134 X |

FOREIGN PATENT DOCUMENTS 449698  10/1991  European Pat. Off. ........ 464/162

*Primary Examiner*—Eileen A. Dunn
*Attorney, Agent, or Firm*—MacMillan, Sobanski & Todd

[57] ABSTRACT

A vehicular driveshaft assembly includes a first universal joint connected to an aluminum yoke shaft having an externally splined hollow body. A first open end of an aluminum sleeve receives the splined body of the yoke shaft. Internal splines of the sleeve cooperate with the external splines of the yoke shaft body to permit axial slip between the sleeve and the yoke shaft. A second end of the sleeve is secured to a first end of a driveshaft tube. A second end of the driveshaft tube is secured to a tube yoke. The tube yoke is connected to a second universal joint.

15 Claims, 3 Drawing Sheets

5,716,276

1

YOKE SHAFT FOR A VEHICULAR DRIVESHAFT ASSEMBLY

BACKGROUND OF THE INVENTION

This invention relates in general to vehicular driveshaft assemblies for transferring power in a vehicle, and in particular to an improved yoke shaft for transferring torque and permitting axial slip in a driveshaft assembly.

In many different types of vehicles, a driveshaft assembly is utilized to transmit rotational power from a source, such as an engine, to a driven component, such as a pair of wheels. A typical vehicular driveshaft assembly provides a rotational driving connection between an output shaft of a vehicular transmission and an input shaft of an axle assembly, while permitting a limited about of relative axial movement therebetween. This axial movement is commonly referred to as "axial slip".

A transmission is connected to the engine to provide desired gear ratios through which engine power is delivered to the wheels. The transmission has an output shaft connected through an elongated driveshaft assembly to an input shaft of an axle assembly. Because of constraints imposed by the overall design of the vehicle, these shafts are rarely aligned such that their axes of rotation are co-axial. Therefore, universal joints are provided between the transmission output shaft and the forward end of the driveshaft assembly and between the rearward end of the driveshaft assembly and the axle assembly input shaft. The universal joints permit the axes of rotation of the adjacent shafts to be angularly disposed, while providing a rotational driving connection therebetween.

A conventional driveshaft assembly includes a forward steel slip yoke connected through a forward universal joint and an aluminum driveshaft tube to a rearward universal joint connected to an axle assembly. The forward steel slip yoke has a forwardly extending hollow portion which is internally splined to cooperate with a male splined output shaft from the transmission. Thus, axial slip is accommodated outboard of the end of the driveshaft assembly. In a second conventional driveshaft assembly, a forward universal joint is connected through a forward steel slip yoke and a steel driveshaft tube to a rearward universal joint connected to the axle assembly. The forward end of the driveshaft tube has a forwardly extending male splined portion which cooperates with an internally splined portion of the slip yoke connected to the forward universal joint. Thus, axial slip is accommodated inboard of the end of the driveshaft assembly. A third conventional driveshaft assembly includes a forward universal joint connected through a forward steel yoke shaft and a steel driveshaft tube to a rearward universal joint connected to the axle assembly. The forward end of the driveshaft tube has a forwardly extending internally splined hollow portion which cooperates with the externally splined, solid cylindrical male portion of the forward yoke shaft connected to the forward universal joint. Thus, axial slip is accommodated inboard of the end of the driveshaft assembly.

SUMMARY OF THE INVENTION

This invention relates to a lightweight and durable vehicular driveshaft assembly. This invention further contemplates a yoke shaft formed from aluminum or an aluminum alloy having splines mated with splines of an aluminum sleeve to transmit rotational power. Axial slip in a driveshaft assembly utilizing this yoke shaft is provided as the yoke shaft slides with respect to the sleeve. Thus, axial slip is accommodated inboard of the end of such a driveshaft assembly. Such a driveshaft assembly provides reduced weight and higher critical speed when compared to known driveshaft assemblies.

In a preferred embodiment, a vehicular driveshaft assembly includes a first universal joint connected to an aluminum yoke shaft having an externally splined hollow body. A first open end of an aluminum sleeve receives the splined body of the yoke shaft. Internal splines of the sleeve cooperate with the external splines of the yoke shaft body to permit axial slip between the sleeve and the yoke shaft. A second end of the sleeve is secured to a first end of a driveshaft tube. A second end of the driveshaft tube is secured to a tube yoke. The tube yoke is connected to a second universal joint.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
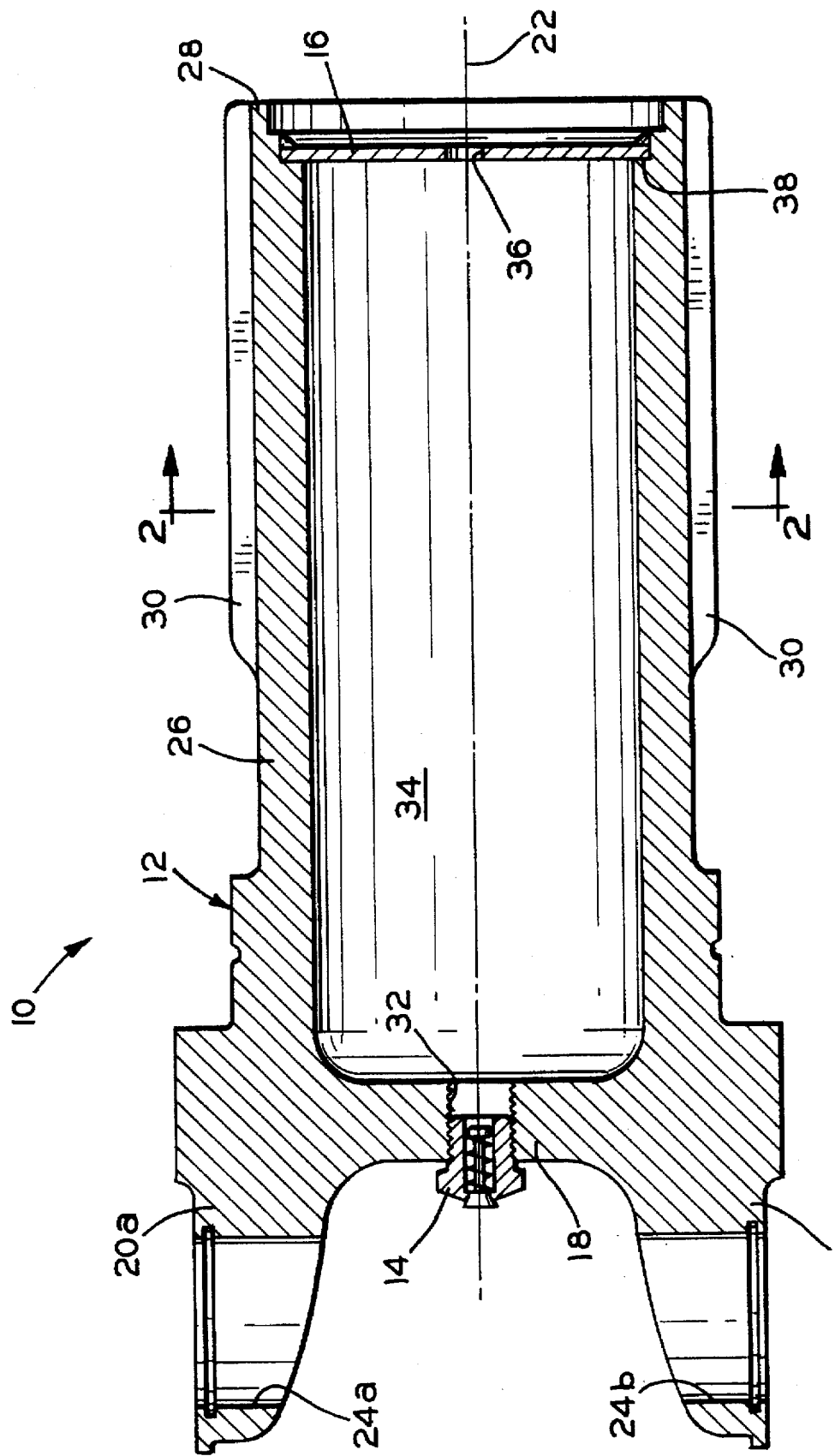
FIG. 1 is an axial sectional view of a yoke shaft in accordance with this invention.

Referring now to the drawings, there is illustrated in FIG. 1 a yoke shaft assembly, indicated generally at 10, according to this invention. The yoke shaft assembly 10 includes a yoke shaft indicated generally at 12, a valve 14 and a plug 16.

The yoke shaft 12 is a hollow cylindrical member including a first or forward end 18 having a pair of opposed, axially extending lugs 20a, 20b. Each lug 20a, 20b projects forwardly (to the left as viewed in FIG. 1) away from the remainder of the yoke shaft 12. Preferably, the lugs 20a, 20b are substantially parallel to a longitudinal axis 22 of the yoke shaft 12. An opening 24a, 24b is provided in each of the lugs 20a, 20b, respectively. The openings 24a, 24b are aligned with one another.

Figure 2:
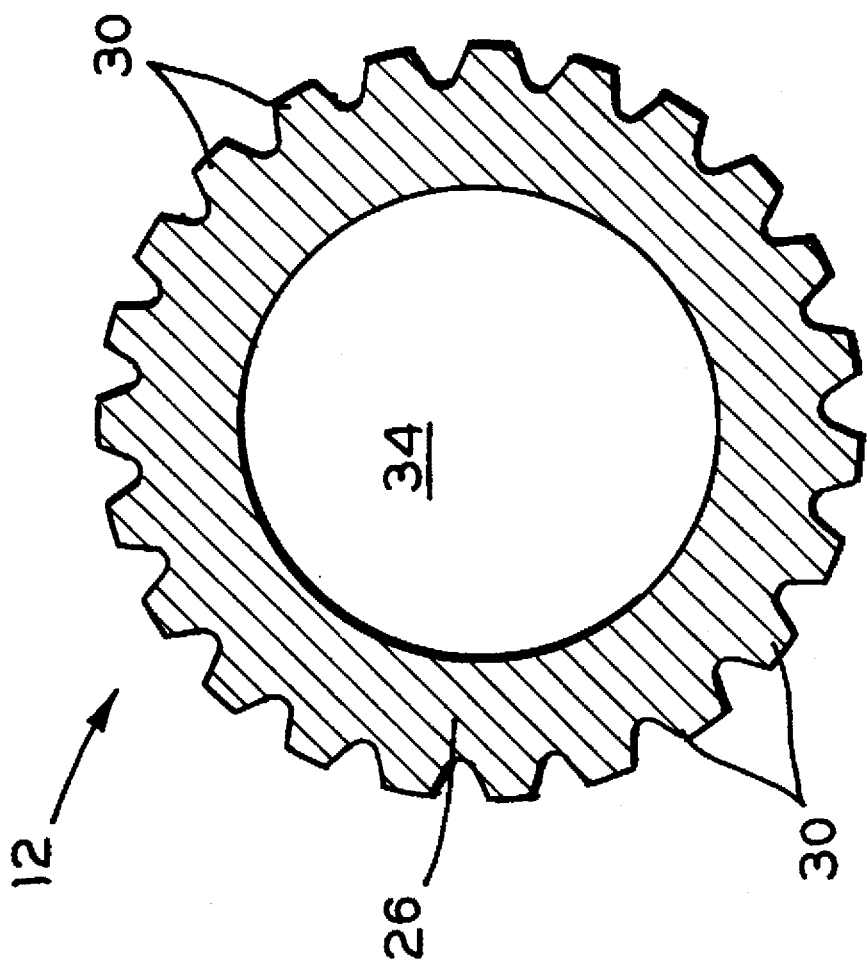
FIG. 2 is a sectional view taken along line 2—2 of FIG. 1.

The first end 18 closes a forward end of a hollow central body 26. A second or rearward end 28 of the central body 26 is open. At least one radially outwardly extending spline 30 is formed on an outer surface of the central body 26. Preferably, a plurality of splines 30 are formed about the circumference of the central body 26 as illustrated in FIG. 2. Preferably, each spline 30 originates adjacent the second end 28 and extends axially along the outer surface of the central body 26 a predetermined distance. Preferably, each spline 30 is parallel to the axis 22 and does not extend radially beyond an outer diameter formed by the lugs 20a, 20b. To reduce friction, the splines 30 are coated with a lubricant, preferably a lubricant containing nylon. A lubricant containing nylon enhances the surface of the splines 30 such than desirable manufacturing tolerances can be achieved.

Preferably, the yoke shaft 12 is an integrally formed, one-piece member which can be manufactured in any desired manner. For example, the yoke shaft 12 can be formed as a casting from a suitable material and machined as desired to form the openings 24a, 24b, the splines 30, and the like. Preferably a lightweight material such as aluminum is used for the yoke shaft 12. For purposes of this description, the use of aluminum as a preferred material also includes the use of aluminum alloys. When a material such as aluminum is used for the yoke shaft 12, the diameter of the central body 26 is generally larger than the diameter of a central body formed from a material such as steel. This larger diameter provides additional strength to resist stresses incurred by the yoke shaft 12 when installed as part of a vehicular driveshaft assembly.

The valve 14 is mounted in a central opening 32 formed in the closed end 18. The valve 14 controls the flow of air into and out of a chamber 34 formed in the interior volume of the central body 26 as the yoke shaft 12 slides axially in a vehicular driveshaft assembly as described below. The plug 16 includes a central orifice 36 and is secured in an interior recess 38 by welding or the like. The plug 16 retains lubricant and prevent debris from reaching the chamber 34.

Figure 3:
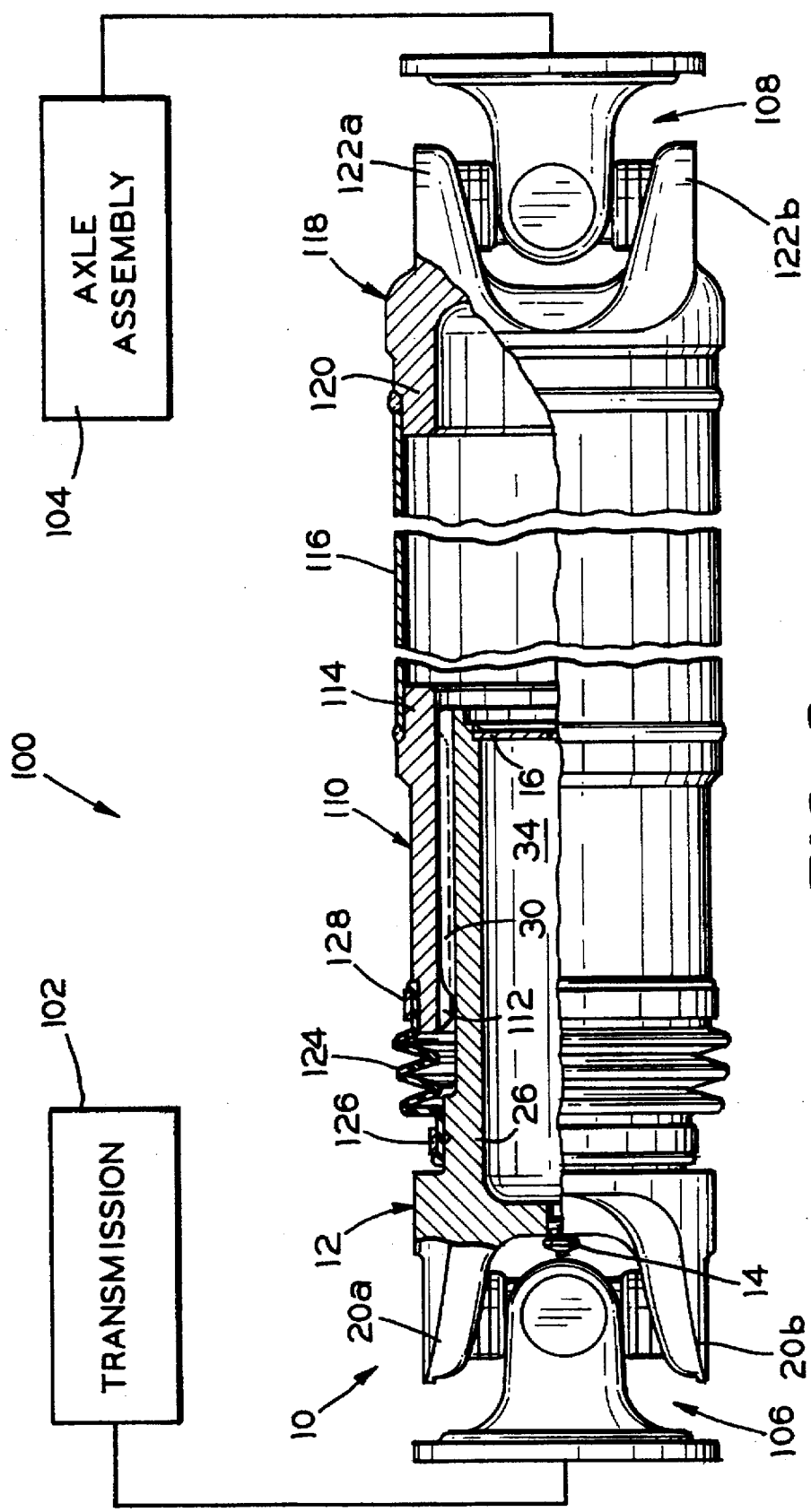
FIG. 3 is an elevational view, partly in axial section, of a vehicular driveshaft incorporating the yoke shaft of FIGS. 1 and 2.

A vehicular driveshaft assembly is indicated generally at 100 in FIG. 3. The driveshaft assembly 100 includes the yoke shaft assembly 10 illustrated in FIGS. 1 and 2 and transmits rotational power from an output shaft of a transmission indicated schematically at 102 to an input shaft of an axle assembly indicated schematically at 104. A first or forward universal joint assembly 106 (left end as viewed in FIG. 3) connects the assembly 100 to the transmission 102. A second or rearward universal joint assembly 108 (right end as viewed in FIG. 3) connects the assembly 100 to the axle assembly 104.

A hollow cylindrical sleeve 110 includes internal splines 112 mated to the splines 30 of the yoke shaft 12. The internal splines 112 extend axially along an inner surface of a forward end of the sleeve 110. Preferably, the splines 112 are coated with a lubricant, particularly a grease to reduce friction. The mated splines 112 and 30 transfer rotational movement from the yoke shaft 12 (delivered from the transmission 102) to the sleeve 110. Simultaneously, the mated splines 112 and 30 permit a predetermined amount of axial slip between the yoke shaft 12 and the sleeve 110. To reduce weight of the assembly 100, the sleeve 110 is preferably formed from a lightweight material such as aluminum or an aluminum alloy.

A reduced outer diameter neck 114 is formed at the rearward end of the sleeve 110. The neck 114 is press fitted into an open forward end of a hollow driveshaft tube 116. At this intersection, the sleeve 110 and driveshaft tube 116 are secured together by welding, adhesive, or other suitable means. Preferably, the driveshaft tube 116 is formed from a lightweight material such as aluminum or an aluminum alloy.

A tube yoke 118 includes a forwardly extending tube seat 120 press fitted into an open rearward end of the driveshaft tube 116. The tube yoke 118 and the driveshaft tube 116 are secured together by welding, adhesive or other suitable means, thereby enabling torque to be transmitted between the driveshaft tube 116 and the tube yoke 118. Preferably, the tube yoke 118 is formed from a lightweight material such as aluminum or an aluminum alloy. Lugs 122a, 122b formed on the rearward end of the tube yoke 118 receive the rearward universal joint assembly 108 in a well-known manner.

A flexible boot 124 is attached at a first end by a retainer 126 to the central body 26 of the yoke shaft 12. A second end of the boot 124 is attached by a retainer 128 to a forward end of the sleeve 110. The boot 124 prevents contaminants from reaching the splines 112 and 30 and expands and contracts as the yoke shaft 12 and sleeve 110 slide with respect to one another.

The driveshaft assembly 100 provides a lightweight connection between the transmission 102 and the axle assembly 104. In a preferred embodiment of the assembly 100, the yoke shaft 12, sleeve 110, driveshaft tube 116 and tube yoke 118 are formed from a lightweight material such as aluminum or an aluminum alloy. Furthermore, the plug 16 is formed from aluminum or an aluminum alloy. In use, axial slip in the assembly 100 is provided as the yoke shaft 12 slides with respect to the sleeve 110. This axial slip is accommodated inboard of the end of the assembly 100. The assembly 100 provides reduced weight and higher critical speed when compared to known driveshaft assemblies.

A preferred embodiment of the assembly 100 includes male splines 30 on the outer surface of the yoke shaft 12 which have been coated with a nylon lubricant, while the female splines 112 of the sleeve 110 are coated with a grease. In another embodiment, female splines 112 can also be coated with a nylon lubricant and grease can be used between the splines 30 and 112. In yet other embodiment, only the female splines 112 can be coated with a nylon lubricant, while a grease is applied to the male splines 30.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A yoke shaft for use in a vehicular driveshaft assembly comprising:
    a hollow cylindrical body having a closed end, an open end, and an outer surface having a plurality of splines formed thereon;
    a pair of opposed lugs extending from said body;
    a plug secured to said body to close said open end so as to define a chamber within said body; and
    a valve mounted in said closed end of said body to control the flow of air into and out of said chamber.

2. The yoke shaft defined in claim 1 wherein said body is formed from aluminum.

3. The yoke shaft defined in claim 1 wherein said body, said lugs, and said splines are formed from a single piece of material.

4. The yoke shaft defined in claim 1 wherein said plug is a plate secured to said body to close said open end.

5. The yoke shaft defined in claim 1 wherein said plug is secured in a recess formed in said body to close said open end.

6. The yoke shaft defined in claim 1 wherein said plug is welded to said body to close said open end.

7. The yoke shaft defined in claim 1 wherein said plug has an orifice formed therethrough.

8. A vehicular driveshaft assembly for providing a rotatable driving connection between an output shaft of a transmission and an input shaft of an axle assembly, said driveshaft assembly comprising:
    a first universal joint adapted to be connected to the output shaft of the transmission;
    a yoke shaft connected to said first universal joint and including a hollow cylindrical body having a closed end, an open end, and an outer surface having a plurality of splines formed thereon, a pair of opposed lugs extending from said body, a plug secured to said body to close said open end so as to define a chamber within said body, and a valve mounted in said closed end of said body to control the flow of air into and out of said chamber;

a driveshaft tube connected to said yoke shaft for rotational movement therewith; and a second universal joint connected to said driveshaft tube and adapted to be connected to the input shaft of the axle assembly.

9. The vehicular driveshaft assembly defined in claim 8 wherein said body is formed from aluminum.

10. The vehicular driveshaft assembly defined in claim 8 wherein said body, said lugs, and said splines are formed from a single piece of material.

11. The vehicular driveshaft assembly defined in claim 8 wherein said plug is a plate secured to said body to close said open end.

12. The vehicular driveshaft assembly defined in claim 8 wherein said plug is secured in a recess formed in said body to close said open end.

13. The vehicular driveshaft assembly defined in claim 8 wherein said plug is welded to said body to close said open end.

14. The vehicular driveshaft assembly defined in claim 8 wherein said plug has an orifice formed therethrough.

15. The vehicular driveshaft assembly defined in claim 8 wherein said driveshaft tube is connected to said yoke shaft for axial movement relative thereto.

* * * * *